(12) United States Patent
Swadi

(10) Patent No.: US 8,849,855 B2
(45) Date of Patent: Sep. 30, 2014

(54) CONTEXT-DIRECTED SEARCH

(75) Inventor: Praveen R. Swadi, Cupertino, CA (US)

(73) Assignee: Yahoo! Inc., Sunnyvale, CA (US)

( * ) Notice: Subject to any disclaimer, the term of this patent is extended or adjusted under 35 U.S.C. 154(b) by 988 days.

(21) Appl. No.: 11/804,123

(22) Filed: May 16, 2007

(65) Prior Publication Data

US 2008/0288454 A1 Nov. 20, 2008

(51) Int. Cl.
*G06F 17/30* (2006.01)
(52) U.S. Cl.
CPC ... *G06F 17/30528* (2013.01); *Y10S 707/99933* (2013.01)
USPC .................................. 707/781; 707/999.003
(58) Field of Classification Search
None
See application file for complete search history.

(56) References Cited

U.S. PATENT DOCUMENTS

| | | | | |
|---|---|---|---|---|
| 2008/0010259 A1* | 1/2008 | Feng et al. | | 707/3 |
| 2008/0086496 A1* | 4/2008 | Kumar et al. | | 707/102 |
| 2009/0112828 A1* | 4/2009 | Rozenblatt | | 707/4 |

* cited by examiner

*Primary Examiner* — Anteneh Girma
(74) *Attorney, Agent, or Firm* — James J. DeCarlo; Greenberg Traurig, LLP

(57) ABSTRACT

When categories are assigned to pieces of information, a search can be focused based on the categories. In an online forum, information is categorized by topic, and a search can be focused on the topic by adding additional search terms or restrictions to a search query, where the additional search terms or restrictions are based upon the categories. The restrictions may restrict the search to a particular web site that is determined based upon the category. In an online forum for answering questions, where the questions are categorized by topic, information related to a question may be located by performing a Web search for search terms extracted from the question. The search can be focused on relevant web sites restricting the search to sites that are related to the question's category. The results of the search may be displayed as related links alongside the question in the online forum.

32 Claims, 6 Drawing Sheets

CONTEXT-DIRECTED SEARCH

BACKGROUND OF THE INVENTION

1. Field of the Invention

The present invention relates generally to information searching techniques, and more specifically to searching for information relevant to a given query and further related to given contextual information.

2. Description of the Related Art

Online forums, such as Yahoo!® Answers, Yahoo!® Groups, and Yahoo!® Messages, provide information that is categorized by topic. These online forums may allow users to ask questions or perform other queries on the information in the forum, or on topics covered in the forum. In these forums, information, such as web pages, relevant to the queries may also be generated by searching documents in a hyperlinked environment. The documents being searched may be, for example, web pages accessible on the Internet via the World Wide Web. The World Wide Web is an example of a hyperlinked environment. A question or a query posed by a user may form the search terms. In one example, the search is carried out by a search engine that locates documents accessible by a network (e.g., the Internet) for which the contents of the documents match a search term. The search is typically text based, where a document matches a search term if the document's text contains that search term.

In existing online forums, since answers are located automatically by performing a text search for the question, the search may locate a previously-provided answer to the question, but may also locate information that does not answer the question, which can clutter the results and make the answer difficult to find in the search results. Answers may also be provided by other users, but there is generally a time delay before another user provides an answer. Therefore it would be desirable to be able to focus the search for an answer on information relevant to the question.

BRIEF SUMMARY OF THE INVENTION

In general, in a first aspect, the invention features a computer-enabled method of searching documents in a hyperlinked environment. The method includes receiving a question that is associated with an information category, extracting a search term from the question, generating a search query based upon the search term, adding at least one restricting term to the search query, wherein the at least one restricting term is based upon the information category; and conducting a search of the hyperlinked environment for at least one document that matches the search query.

Embodiments of the invention may include one or more of the following features. The method may include displaying at least one reference to the at least one document that matches the search query, where the at least one reference is displayed in association with the question. The at least one document may include a web page, and displaying at least one reference comprises displaying at least one link to the web page. The link may be displayed on a web page of an online forum in association with the question. The information category may include a named level in a hierarchy of categories provided by an online forum. Extracting a search term from the question may include selecting the search term from the question using a search term extractor. Generating a search query may include forming a disjunction of multiple search terms in response to the search term comprising multiple search terms. Adding at least one restricting term to the query may include adding a site scope modifier to the query, wherein the site scope modifier restricts the query to at least one web site associated with the category. The method may include selecting the at least one web site associated with the category from a mapping table that associates the at least one web site with the category. Conducting the web search may include invoking a search engine to search at least one web site specified by the site scope modifier for the search term. The mapping table may be associated with an online forum. The at least one restricting term may be based upon user preference information associated with a user. The user preference information may include information associated with an online forum. The at least one document may include at least one web page, and displaying a reference to the at least one document comprises displaying at least one link to the at least one web page.

In general, in a second aspect, the invention features a computer-enabled method of finding information related to a question. The method includes receiving the question, wherein the question relates to at least one information category, determining at least one search term based upon the question, selecting at least one web site corresponding to the at least one information category, and conducting a web search of the at least one web site for the at least one search term.

Embodiments of the invention may include one or more of the following features. The method may include receiving at least one matching web page from the results of the web search, and displaying in association with the question at least one link to the at least one matching web page. Displaying in association with the question at least one link may include including the at least one link in a web page that includes the question. The method may include making the web page that includes the question available for viewing by at least one user who views the question. Selecting at least one web site may include selecting the at least one web site from a mapping table that associates the at least one web site with the category. Conducting the web search may include invoking a search engine to search for the at least one search term, and the at least one web site is provided to the search engine as a site scope modifier that restricts the search to the at least one web site. The search engine may be invoked to search for the at least one search term in response to the at least one search term comprising multiple search terms. Selecting at least one web site may include selecting the at least one web site based upon preference information associated with a user. Determining at least one search term may include selecting the at least one search term from the question using a search term extractor.

In general, in a third aspect, the invention features a computer-enabled method of finding web pages related to a question. The method includes generating a search query based upon search terms extracted from the question in response to receipt of the question from an invoker, adding at least one restricting term to the search query, wherein the at least one restricting term is based upon a category associated with the question, conducting a search for computer-readable documents that match the search query, and sending to the invoker at least one link produced by the search, wherein the at least one link comprises at least one reference to at least one document that matches the search query.

Embodiments of the invention may include one or more of the following features. Generating a search query may include selecting at least one search term from the question using a search term extractor. Generating a search query may include forming a disjunction of multiple search terms in response to the at least one search term comprising multiple search terms. Adding at least one restricting term to the query may include adding a site scope modifier to the query, wherein the site scope modifier restricts the query to at least one web site associated with the category. The site scope modifier may be determined based upon input received from a user. The method may include the step of selecting the at least one web site associated with the category from a mapping table that associates the at least one web site with the category. Conducting the web search may include invoking a search engine to search at least one web site specified by the site scope modifier for the at least one search term.

In general, in a fourth aspect, the invention features a computer program product comprising program code for searching documents in a hyperlinked environment. The computer program product includes program code for receiving a question, wherein the question is associated with an information category, program code for extracting at least one search term from the question, program code for generating a search query based upon the at least one search term, program code for adding at least one restricting term to the search query, wherein the at least one restricting term is based upon the information category, and program code for conducting a search of the hyperlinked environment for at least one document that matches the search query.

Embodiments of the invention may include one or more of the following features. The computer program product may include program code for displaying in association with the question at least one reference to the at least one document that matches the search query. Extracting at least one search term from the question may include selecting the at least one search term from the question using a search term extractor. Generating a search query may include forming a disjunction of multiple search terms in response to the at least one search term comprising multiple search terms. Adding at least one restricting term to the query may include adding a site scope modifier to the query, wherein the site scope modifier restricts the query to at least one web site associated with the category. The computer program product may further include program code for selecting the at least one web site associated with the category from a mapping table that associates the at least one web site with the category, wherein the mapping table associates categories with corresponding web sites, and the mapping table further associates the at least one web site with the category. Conducting the web search may include invoking a search engine to at least one web site specified by the site scope modifier for the at least one search term.

In general, in a fifth aspect, the invention features a computer program product comprising program code for finding web pages related to a question. The computer program product includes program code for generating a search query based upon search terms extracted from the question in response to receipt of the question from an invoker, program code for adding at least one restricting term to the search query, wherein the at least one restricting term is based upon a category associated with the question, program code for conducting a search for computer-readable documents that match the search query, and program code for sending to the invoker at least one link produced by the search, wherein the at least one link comprises at least one reference to at least one document that matches the search query. Generating a search query may include selecting at least one search term from the question using a search term extractor. Generating a search query may include forming a disjunction of multiple search terms in response to the at least one search term comprising multiple search terms. Adding at least one restricting term to the query may include adding a site scope modifier to the query, wherein the site scope modifier restricts the query to at least one web site associated with the category. The computer program product may include program code for selecting the at least one web site associated with the category from a mapping table that associates the at least one web site with the category. Conducting the web search may include invoking a search engine to search at least one web site specified by the site scope modifier for the at least one search term.

DETAILED DESCRIPTION OF THE INVENTION

The following description is presented to enable any person skilled in the art to make and use the invention, and is provided in the context of particular applications and their requirements. Various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and devices are shown in block diagram form in order not to obscure the description of the invention with unnecessary detail. Thus, the present invention is not intended to be limited to the embodiments shown, but is to be accorded the widest scope consistent with the principles and features disclosed herein.

Figure 1:
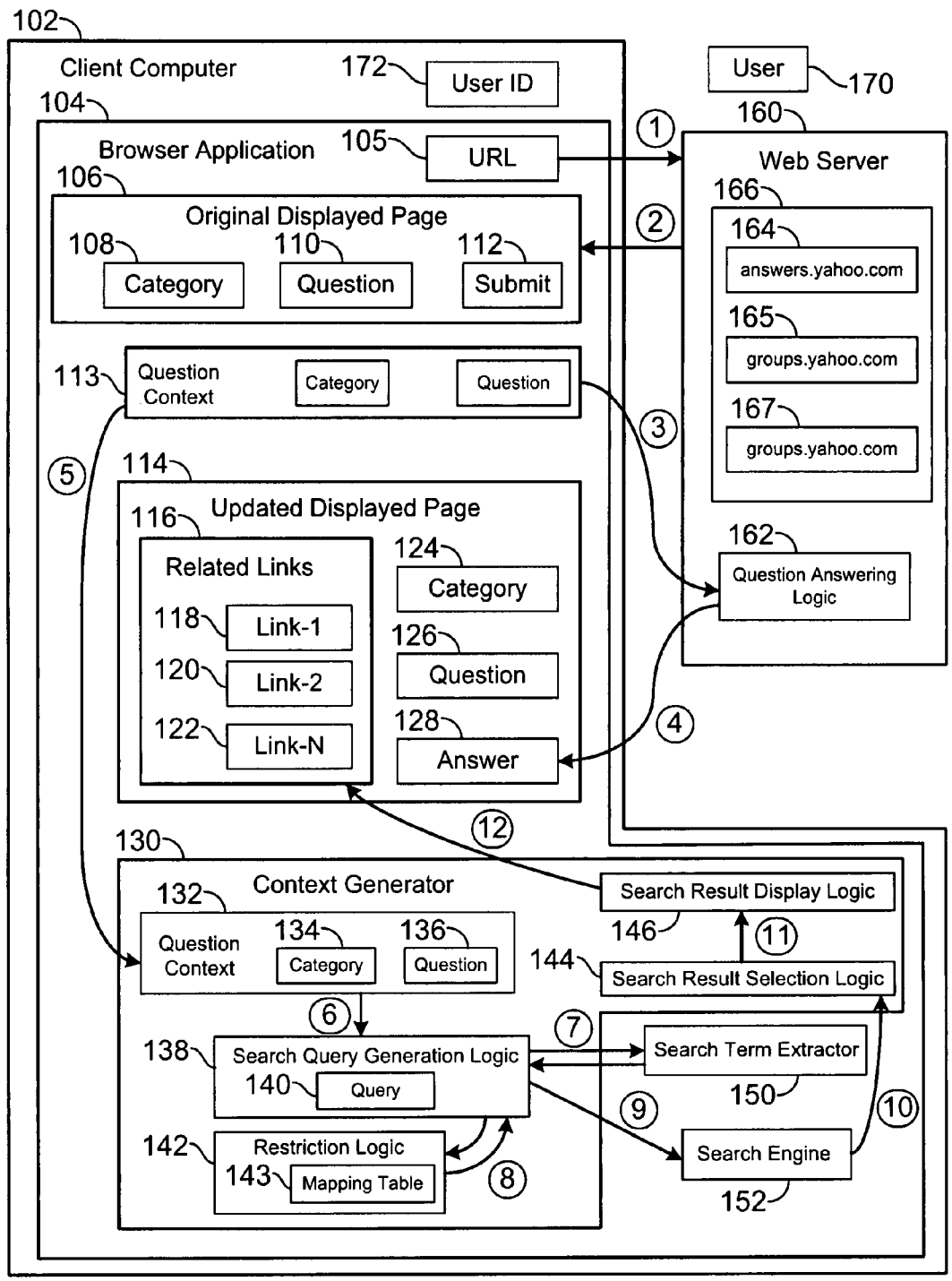
FIG. 1 is an illustrative drawing of a context generator in a web browser in accordance with embodiments of the invention.

FIG. 1 is an illustrative drawing of a context generator 130 in a web browser in accordance with embodiments of the invention. In one example, the context generator 130 searches for and displays related links 116. The related links 116 are links to documents that are related to a question 110 posed by a user 170. The context generator 130 searches a hyperlinked environment for the documents. The hyperlinked environment includes documents, such as web pages, that are referred to by links, such as web links. Web links are also known as Uniform Resource Locators (URL's.). The documents include searchable content, such as text or other media, e.g., sound or images. Example hyperlinked environments include the World Wide Web and other web-like environments in which links may be used to reference documents. The links may refer to documents hosted by a computer accessible via a network, as is possible with URL's. A link is, for example, a reference to a document.

In one example, a web browser application 104, e.g., Microsoft® Internet Explorer, Mozilla® Firefox®, or the like, executes on a client computer 102. The user 170, e.g., a human, interacts with the web browser 104 by entering and viewing information, such as questions and answers. Each user 170 is identified by an associated user ID 172, which is typically a name or number. The client computer 102 communicates with a Web server 160 via a network such as the Internet or another network. The web browser is not restricted to use on the World Wide Web, and may be used to view documents and links in any hyperlinked environment, e.g., a mobile phone. The web browser displays links and allows a user to "follow" a link, e.g., by clicking on it using a mouse and cursor, to view the document referenced by the link.

In one example, the Web server 160 provides one or more web site(s) 160 that execute within the server, such as answers.yahoo.com 164, groups.yahoo.com, or messages.yahoo.com, in response a request for a specific URL 105. The web site(s) 160 are, for example, server computers accessible by a network such as the Internet that provide documents referenced by links. For example, a web site 160 may be a site on the World Wide Web accessible by remote computers via the Internet. The web site 160 may respond to requests received on the network from the client computer 102 for documents specified by Uniform Resource Locators (URL's) by sending web pages to the client computer 102. A web site 160 may provide one or more such documents retrievable by associated URL's. The web site(s) 160 may be implemented as, for example, server pages using Java® Server Pages (JSP), a server page framework, or any other server implementation technique. The browser application 104 sends a request for a URL 105 to the web server 160 (see arrow 1). The Web server 160 provides a web page of the web site 164 that corresponds to the URL 105. The web page is displayed by the browser application, e.g., as an original displayed page 106 and an updated displayed page 114. The original displayed page 106 is, for example, a web page with an input field for receiving the question 110. The updated displayed page 114 is, for example, a web page on which the answer 128 is displayed along with the question 126, the category 124, and the related links 116, which are links to information that is related to the question. The related links 116 are, for example, hyperlinks that refer to web pages that are related to the question 110. The related links 116 include one or more links, e.g., a first link 118, a second link 120, and an Nth link 122. The related links 116 may also refer to advertisements. In one example, the types of related links 116 that can be generated include links to domain specific sites related to the category. Such domain-specific sites provide information related to the domain, i.e., domain knowledge. In another example, the related links 116 may be links to web sites of advertisers that trade in the domain, e.g., advertisers in businesses or selling products related to the domain. The updated displayed page 114 also displays a category 124, which is typically the same as the category 108 of the original displayed page 106.

The web site(s) 160 may be any type of web site in which information, e.g., web page content, is associated with a category. For example, the web site 160 may be an information directory, such as the Yahoo!® web site.

In one example, the web site(s) 160 provided by the Web server 160 are online forums, such as answers forums, e.g., answers.yahoo.com 164, in which answers are provided to questions asked by user(s) 170. The questions are associated with categories such as sports, entertainment, news, and the like. Some site(s) 160 or online forums are specialized for a particular subject area, and provide information in that subject area. For example, the site sports.yahoo.com specializes in sports information, sports scores, sports news, and the like. In one example, information relevant to a question may be found by searching specialized sites that specialize in the subject matter of the question. In one example, these specialized sites may be selected from a mapping table that maps categories to sites. Therefore, the category associated with a question may be used to determine specific web site(s) to search for information relevant to the question.

Answer forums typically have special presentation features for organizing user postings as questions and answers to questions. Answer forums also provide automated question answering, which is a feature for providing one or more answers to a question soon after the question is asked. The automated question answering feature may, for example, look up previous answers to similar questions in a database, or may perform a web search to find information that answers the question. The portion of the answer forum that performs automated question answering is shown in FIG. 1 as question answering logic 162. The question answering logic 162 may be, for example, computer program code that provides possible answers 128 to a given question 110 by, for example, searching a database for similar questions, or searching the web, or by any other means.

Other examples of online forums include group forums, such as groups.yahoo.com, in which users 170 join groups that are devoted to particular topics and post messages in the groups, and message forums, such as messages.yahoo.com, in which users 170 post messages in particular categories. Although the three types of forums described here provide similar message posting features, each type of forum may have special characteristics. In group forums, users 170 typically identify themselves, e.g., log in, before reading or writing messages. Some forums allow users 170 to read and post messages anonymously. Other examples of forums include news web sites such as news.yahoo.com, and travel sites such as travel.yahoo.com, and the like.

Users 170 may identify themselves in online forums by, for example logging in to the web site 164 by providing a user ID 172 and password (not shown). A user 170 may post information, such as a message or answer, in an online forum, and the posted information is associated with the user's user ID 172. The posted information is made available by the web site 164 for other users to read. Users 170 that identify themselves may provide additional information such as demographic data and preferences about how they prefer to access the forum.

In one example, an original displayed page 106 is displayed to a user 170 on the client computer 102 by the browser application 104. The original displayed page 106 is generated by the Web server 160 and sent to the client computer 102 via a network such as the Internet (see arrow 2). The original displayed page 106 is a web page that provides an input field in which a user provides a question 110. A category 108 may be associated with the question 110. The category 108 may be, for example, an information category, such as News, Entertainment, Sports, Education, or the like. The category 108 may be a hierarchical path, e.g., "News>Business>Stocks", where a broad information category, e.g., News, is followed by subcategories, e.g., Business, which is a subcategory of News, and Stocks, which is a subcategory of Business. The category 108 may be related to the subject matter of the question 110.

A category 108 may be assigned to the question 110 in response to the user providing the question 110. For example, a user may select the category 108 for the question 110 before entering the question 110 into the displayed page 106. In another example, the category 108 may be assigned subsequently to the user providing the question 110 e.g., by the question answering logic 162, which may automatically select an appropriate category based on the words in the question, or by the user, who may select a category 108 after entering the question 110.

In one example, the question 110 (and optionally, other information, such as the category 108) is sent to the web server 160 in response to the user 170 selecting or pressing the Submit button 112 (see arrow 3). The question 110 and related information, such as the category 108, and the user ID 172, form a question context 113. The web server 160 passes the question context 113 to the question answering logic 162, which determines an answer 128 for the question and sends the answer 128 back to the browser application 104 via the communication network (see arrow 4). The answer 128 may be sent back to the browser application 104 as a web page, or as a string, or in any other format recognized by the browser application 104.

In one example, when the user 170 asks a question 110, e.g., by entering the question 110 as text in the original displayed page 106, the context generator 130 receives the question 110 and the category 108 as an input context 134 (see arrow 5). The input context 134 includes a category 134 and a question 136 (and possibly other information related to the question, such as the user identifier 172), which are the same as the respective category 108 and question 110 in the original displayed page 106. The input context 132 may be the same as the question context 113 sent to the question answering logic. The context generator 130 uses the input context 132 to generate the related links 116, which are displayed as part of the updated displayed page 114 (see arrow 12). In one example, the context generator 130 is a browser plug-in or script, which is implemented as computer program code that executes on the client computer 102. The content generator 130 may be implemented in a computer programming language, such as the JavaScript™ programming language or the like.

The context generator 130 includes search query generation logic 138, restriction logic 142, search result selection logic 144, and search results display logic 146. The search query generation logic 138 receives the input context 132 (see arrow 6) and generates a query 140 to be provided to a search engine 152. The search query generation logic 138 generates the query 140 by extracting search terms from the question 136 by, for example, invoking a search term extractor 150 (see arrow 7). The search term extractor 150 extracts search terms from a string by, for example, selecting commonly used words or phrases from the string, or by using other search term extraction methods, as known to those skilled in the art of data searching. Typically, the search term extractor 150 and the search engine 152 are provided by a server computer 153 accessible via the communication network, and interactions with the extractor 150 and search engine 152 are performed via network invocations such as remote procedure calls or web service invocations.

The search query generation logic 138 uses the extracted search terms to generate the query 140. In one example, the query 140 is generated by constructing a query that includes a disjunction of some or all of the extracted search terms. The expression "house or boat" is a disjunction of "house" and "boat". A disjunction is, in one example, an expression formed by the logical "or" of two terms. In a search query, a disjunction expression matches either of the two terms separated by an "or" operator.

If, for example, more than a threshold number (e.g., 5 or 10) of search terms are returned, then the query includes only the threshold number of search terms. If the search term extractor 150 ranks or assigns a rating to the search terms, then the highest ranked or rated search terms may be included in the query. In other examples, a conjunction, i.e., the logical "and" of the search terms, may be used instead of the disjunction. In still other examples, a disjunction may be used between some terms, and a conjunction may be used between other terms in the query.

In one example, restriction logic 142 restricts the query 140, e.g., by adding to the query additional search options or terms, such as a site scope modifier that restricts the query to search specified web sites (see arrow 8). A site scope modifier specifies that the search is to be restricted to searching one or more specific web sites specified by the site scope modifier. The site scope modifier is represented as a "site:<X>" parameter, where X is a site to be searched. For example, the site scope modifier "site www.yahoo.com" specifies that a query is to be restricted to searching the web site www.yahoo.com. The query "house or boat site:www.yahoo.com", for example, specifies that the site www.yahoo.com is to be searched for web pages containing either the word house or the word boat, or both. The "or" between "house" and "boat" is a logical or, which specifies that the query matches either of the terms separated by the word "or", i.e., "house" or "boat", so that a search for that query will return the web pages on the site www.yahoo.com that contain either "house" or "boat" or both. The site scope modifier may also be represented as a specific parameter value in an invocation of a web service search API.

The query 140 may be augmented with restricting terms or options, which are referred to herein as restrictions. The restriction logic 142 uses the input context 132 to determine restriction terms to be added to the query 140. In one example, the restriction logic 142 uses the category 134 in the input context 132 to generate a site scope modifier that restricts the search to web sites that correspond to the category 134. Restrictions may be generated based upon the category by consulting a mapping table 143 that maps categories to corresponding restrictions. For example, the following instance of the mapping table 143 shows possible restrictions for three different categories.

| Mapping Table | |
| --- | --- |
| Category | Restriction |
| Home > Arts & Humanities | site:culture.yahoo.com |
| Home > Sports > Football (American) | site:sports.yahoo.com |
| Home > Entertainment & Music > Celebrities | site:movies.yahoo.com |

Each entry in the Restriction column may include one or more restrictions associated with the corresponding entry for a given row in the Category column. A category may be associated with multiple restrictions, in which case the multiple restrictions will be applied when the search is executed. The Restriction column shown above includes site scope restrictions, but other types of restrictions are possible, including additional search terms, e.g., "humanities site: culture.yahoo.com" would be a possible restriction for the Home>Arts & Humanities category. This restriction specifies that the search query includes the term "humanities" and the parameter "site:culture.yahoo.com" when the search is associated with the Home>Arts & Humanities category.

In one example, the particular entries in the mapping table 143, e.g., the specific categories and corresponding restrictions, are established by a system administrator or designer using an administrative interface. In one example, users may customize the categories and restrictions. Users may, for example, customize the mapping table 143 by supplying user-defined categories and corresponding user-defined restrictions. The user-defined categories and restrictions may be added as a row in the mapping table 143. The particular contents of the mapping table 143 are typically specific to a particular application, such as forums hosted by a particular forum provider. The contents of the mapping table 143 may be specific to a type of forum or to a particular user. For example, a first mapping table such as the table shown above may be associated with a particular forum, such as Yahoo!® Answers, and a second mapping table 143 may be associated with a different forum, such as Yahoo!® Groups. In that case, the particular mapping table 143 associated with a forum is used in determining the restrictions to be applied to searches that originate in that forum.

Although the phrase "mapping table" is used herein to describe the association of categories to restrictions, the association need not be represented as a table. Any type of association may be used, such as a list of categories in which each entry includes a reference to an associated restriction. As another alternative, the association may be provided by an API interface that hides the particular implementation of the association, and simply allows associations between two data elements to be established and retrieved. The mapping table 143 may be changed, either by an administrator, or based on user input, or based on search results.

The search query generation logic 138 invokes the search engine 152 to search for documents, e.g., web pages, that match the query 140 (see arrow 9). The query 140 may be represented as, e.g., a string or as a set of objects, and the representation of the query 140 is passed to the search engine 152, e.g., via an application programming interface (API), e.g., using a web service such as the Yahoo!®Search API, or by invoking the search engine by submitting an HTTP request message that contains a string representation of the query 140 in the appropriate HTML field. The search engine returns a set of links (e.g., URL's) that refer to documents or web pages that match the query 140. The set of links is passed to search result selection logic 144 (see arrow 10), which selects some or all of the links and passes the selected links to search results display logic 146 (see arrow 11). If, for example, more than a threshold number (e.g., 4 or 8) of links are returned by the search engine 152, then the search result selection logic 144 passes only the threshold number of links to the search results display logic 146 (arrow 11).

The search results display logic 146 converts the set of links to a form suitable for display as the related links 116 on the updated displayed page 114. For example, if N links are selected by the search result selection logic 144, the search result display logic constructs a displayable document, e.g., in the Hypertext Markup Language (HTML), that will cause the browser application 104 to display the N links in the related links area 116 as Link-1 118, Link-2 120, through Link-N 122. Each link may be displayed as a hyperlink would be displayed in an HTML document, e.g., as one or more words of text displayed as underlined or blue text that a user can follow, e.g., by clicking a mouse or other selection device while a cursor is positioned over the text, to open the document or web page that the link refers to. An image may be displayed as a representation of each link, and the user may click on the image to follow the link to open the document or web page that the link refers to. The related links 116 are therefore displayed in association with, e.g., on the same page 114 as, the answer 128. The user 170 viewing the question 126 and the answer 128 may thus select one or more of the related links 116 to view information related to the question 126.

Methods for generating web pages such as the updated displayed page 114 with embedded links 116 are known to those skilled in the art of web page design. The search results display logic 146 may use such well-known methods. The search results display logic 146 may generate the updated displayed page 114, or may generate the related links 116 and pass them to another component that generates the updated displayed page, or otherwise make them available for display in the updated displayed page 114.

Figure 2:
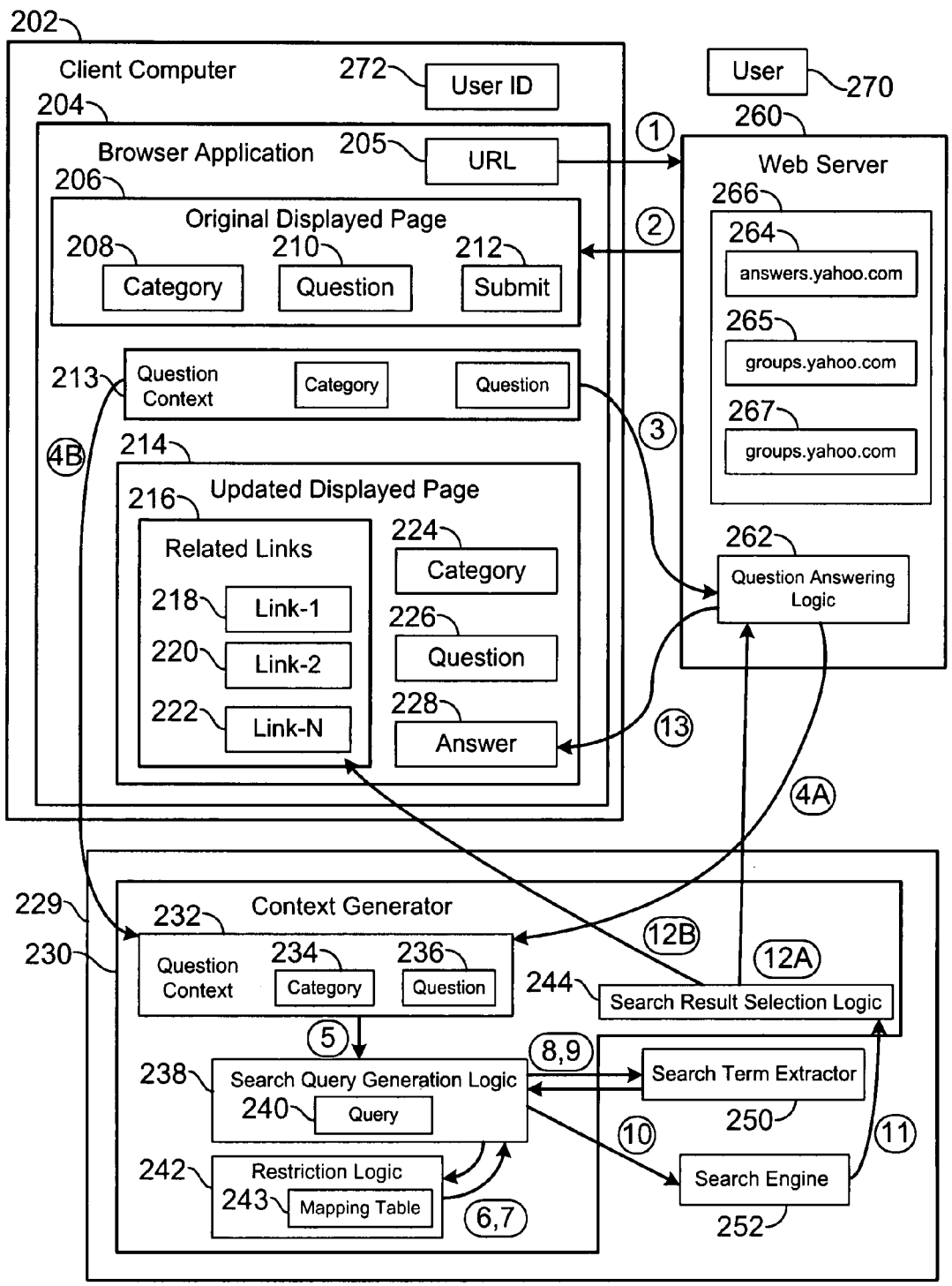
FIG. 2 is an illustrative drawing of a context generator web service in accordance with embodiments of the invention.

FIG. 2 is an illustrative drawing of a context generator web service in accordance with embodiments of the invention. FIG. 2 shows an alternative configuration of a context generator 230, which includes logic components analogous to those shown in FIG. 1. The context generator 230 may be a web service, e.g., a Simple Object Access Protocol server process, or a server process that responds to requests in any other protocol. The context generator 230 may be implemented as computer program code in the JavaScript™ programming language or in some other programming language, e.g., the Java®, Python®, or C++ language, or the like. One or more web sites are provided by web server processes executing on a web server computer 260, which is analogous to the web server 160 of FIG. 1.

Multiple different deployment configurations are possible for the logic components shown in FIG. 2. A particular deployment configuration, i.e., arrangement of logic components on server computers, may be chosen by an administrator or system designer as appropriate for the available resources and expected usage patterns. FIG. 2 shows a deployment configuration in which a context generator 230 is located on a server 229, which may be the same as a web server 260, or may be separate from the web server 260. The context generator 230 is analogous to the context generator 130 of FIG. 1, and question answering logic 262 is analogous to the question answering logic 162 of FIG. 1. The logic components of the context generator 230, including search query generation logic 238, restriction logic 242, search term extraction logic 250, and search result selection logic 244, perform methods analogous to the methods performed by the respective components of FIG. 1 (i.e., the search query generation logic 138, the restriction logic 142, the search result selection logic 144, and the search results display logic 146). However, the context generator 230 may receive its input, i.e., input context 232, from a client computer 202 via a communication network, e.g., the Internet, as a web service invocation, and may return the related links 216 to the client computer 202 as a result value of the web service invocation. The question answering logic 262 is shown executing on the web server 260. However, the question answering logic 262 may alternatively be located on another computer, such as the server 229, in which case the question 210 would be sent by either the client computer 202 or the web server 260 to the question answering logic via the communications network.

In the example configuration of FIG. 2, a browser application 204 sends a request for a web page specified by an address such as a Uniform Resource Locator (URL) 205 to a web site 266 identified by the URL (see arrow 1). The request is sent via a communication network such as the Internet as, for example, a Hypertext Transport Protocol (HTTP) request message. A web server 260 receives the request and passes it to the web site 266, e.g., answers.yahoo.com. The web site 266 generates a representation of an original displayed page 206, e.g., a Hypertext Markup Language (HTML) document that includes fields for a category 208, a question 210, and a submit button 212, and sends the representation to the browser application 204 as, for example, an HTTP reply message (see arrow 2).

The browser application 204 displays the original displayed page 206. The browser application may then receive a question 210 and an optional category 208 as input, e.g., from a user 270, in the original displayed page 206. Upon selection of a submit button 212, e.g., in response to a user clicking a mouse while a cursor is positioned over the submit button 212, the browser application sends the category 208 and question 210 as a question context 213 to the web server 260 (arrow 3). The web server 260 passes the question context 213 to a web site (e.g., server page) that executes within the server, e.g., answers.yahoo.com 264, which may be implemented as, for example, a server page. Question answering logic 262, which may execute on the web server 260 or on a different server, generates an answer 228 to the question.

Depending on the particular configuration or deployment in use, any of the browser application 204, the web site 264, or the question answering logic 262 may send the question context 213 to the context generator 230 to generate the related links 216. The context generator 230 receives the question context 213 as a question context 232. The particular component that invokes the context generator 230 to generate the related links 216, and the timing of the invocation relative to the return of the answer 228 by the question answering logic 262, may be different in different configurations or embodiments. In some examples, the question answering logic 262 invokes the context generator 230 (see arrow 3) and returns the answer 228 and the related links 216 together (arrow 13). In other examples, the question answering logic returns the answer 228 separately (arrow 2) from the related links 216, and the web site logic (e.g., server page), invokes the context generator 230 (see arrow 4A). In still other examples, another component invokes the context generator 230. For example, the browser application 204 may invoke the context generator 230 when the submit button 212 is pressed (see arrow 4B). The component that invokes the context generator 230 uses a web service call, and is referred to herein as an "invoker". The web service call may be a Simple Object Access Protocol (SOAP) call, or may use any other protocol recognized by the invoker and the content generator 230. The context generator 230 may execute on the same computer as the invoker, in which the web service call may be an inter-process or intra-process invocation on the same computer. If the context generator 230 executes on a separate computer from the invoker, then the invoker sends the web service call as a request via the communication network to the context generator 230, and receives the related links 216 as a response from the context generator 230 via the communication network.

The context generator 230 generates related links 260 as described above with respect to FIG. 1. The input context 232 is passed to search query generation logic 238 (see arrow 5). The search query generation logic 238 extracts search terms from the question 234 by invoking search term extraction logic 250 (see arrows 8 and 9). The search query generation logic 238 constructs the logical "or", i.e., disjunction (or logical "and", i.e., conjunction, or other logical combination) of the extracted search terms to form the query 240. The search query generation logic 238 invokes restriction logic 242 to restrict the query 240 based upon the category 234 (see arrows 6 and 7). The search query generation logic 238 passes the query 240 to a search engine 252 (see arrow 10), and passes the search results returned by the search engine 252 to search result selection logic 244 (see arrow 11). The context generator 230 returns some or all of the search results, selected by the search result selection logic 244, to the invoker, e.g., as return parameters in a remote method invocation. For example, if the invoker is the question answering logic 262, the search results are returned to the question answering logic 262 (see arrow 12A). If the invoker is the browser application 204, the search results are returned to the browser application 204 (see arrow 12B). The invoker constructs the related links 216 and causes them to be displayed in the updated displayed page 214 along with the category 224, the question 226, and the answer 228. The category 224 and the question 226 of the updated displayed page 214 are typically the same as the category 208 and the question 210 of the original displayed page 206.

Figure 3:
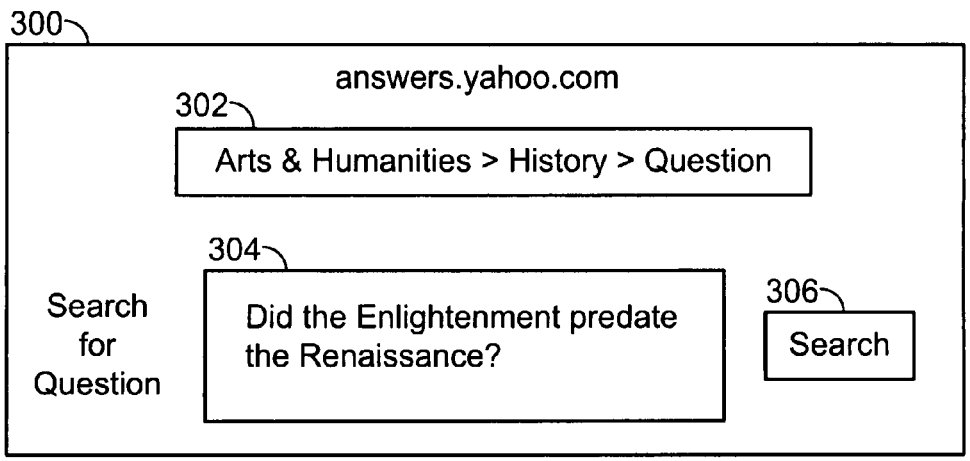
FIG. 3 is an illustrative drawing of a prior art online question-answering forum showing a question associated with a category.

FIG. 3 is an illustrative drawing of an online question-answering forum showing a question associated with a category. In this example, the forum is answers.yahoo.com, which is an online forum accessible via a web site interface 300, and is typically displayed in a browser application such as the browser application 140 of FIG. 1. The web site interface 300 corresponds to the original displayed pages 106 of FIG. 1. Users may ask questions in the forum, such a question 304 ("Did the Enlightenment predate the Renaissance?"). The user selects or provides a category 302 ("Arts & Humanities>History>Questions") for the question 304. The user submits the question to the question-answering forum by clicking or selecting the search button 306. In other examples, the category 302 may be inferred automatically from the question 304, or may be selected by the user from a list of suggested categories (not shown) after the question 304 has been submitted.

Figure 4:
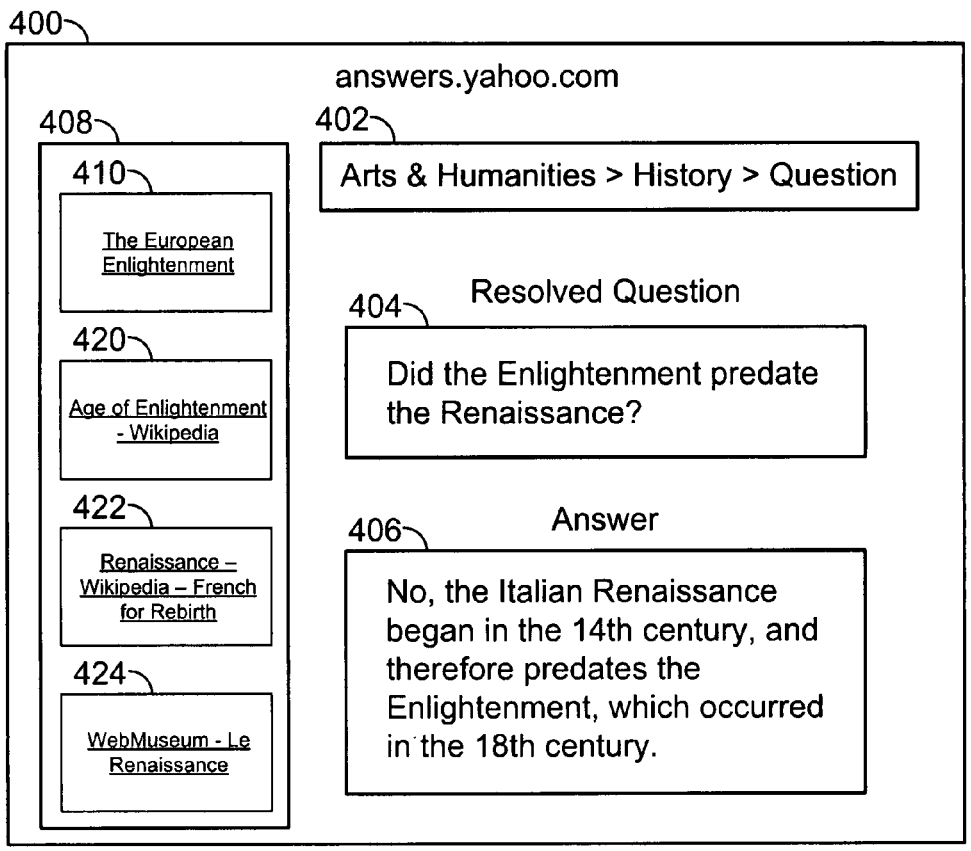
FIG. 4 is an illustrative drawing of an online question answering forum showing a related links generated for a question by a context generator in accordance with embodiments of the invention.

FIG. 4 is an illustrative drawing of an online question answering forum showing a related links generated for a question by a context generator in accordance with embodiments of the invention. A web site interface 400 displays an answer 406 ("No . . . ") and related links 408 that correspond to a question 404 asked by a user in an online forum, e.g., answers.yahoo.com. The web site interface 400 is typically displayed in a browser application such as the browser application 140 of FIG. 1. The question 404 is associated with a category 402. The question 404 and the category 402 are typically the same as the question 304 and the category 302, respectively, in the question-submission user interface 300 of FIG. 3.

The web site interface 400 corresponds to the updated displayed page 114 of FIG. 1. The answer 406 is generated by the question answering logic 162, and the related links are generated by the context generator 130 of FIG. 1. The related links correspond to the related links 116 of FIG. 1. In the example of FIG. 4, the related links 408 include a first link 410, for which text ("The European Enlightenment") is displayed, a second link 420 ("Age of Enlightenment—Wikipedia"), a third link 422 ("Renaissance—Wikipedia"), and a fourth link 424 ("WebMuseum—Le Renaissance"). Each link is associated with a reference to a document, e.g., a URL that refers to a web page. The user may select one or more of the related links 408 to view the document or web page referenced by that link.

Figure 5:
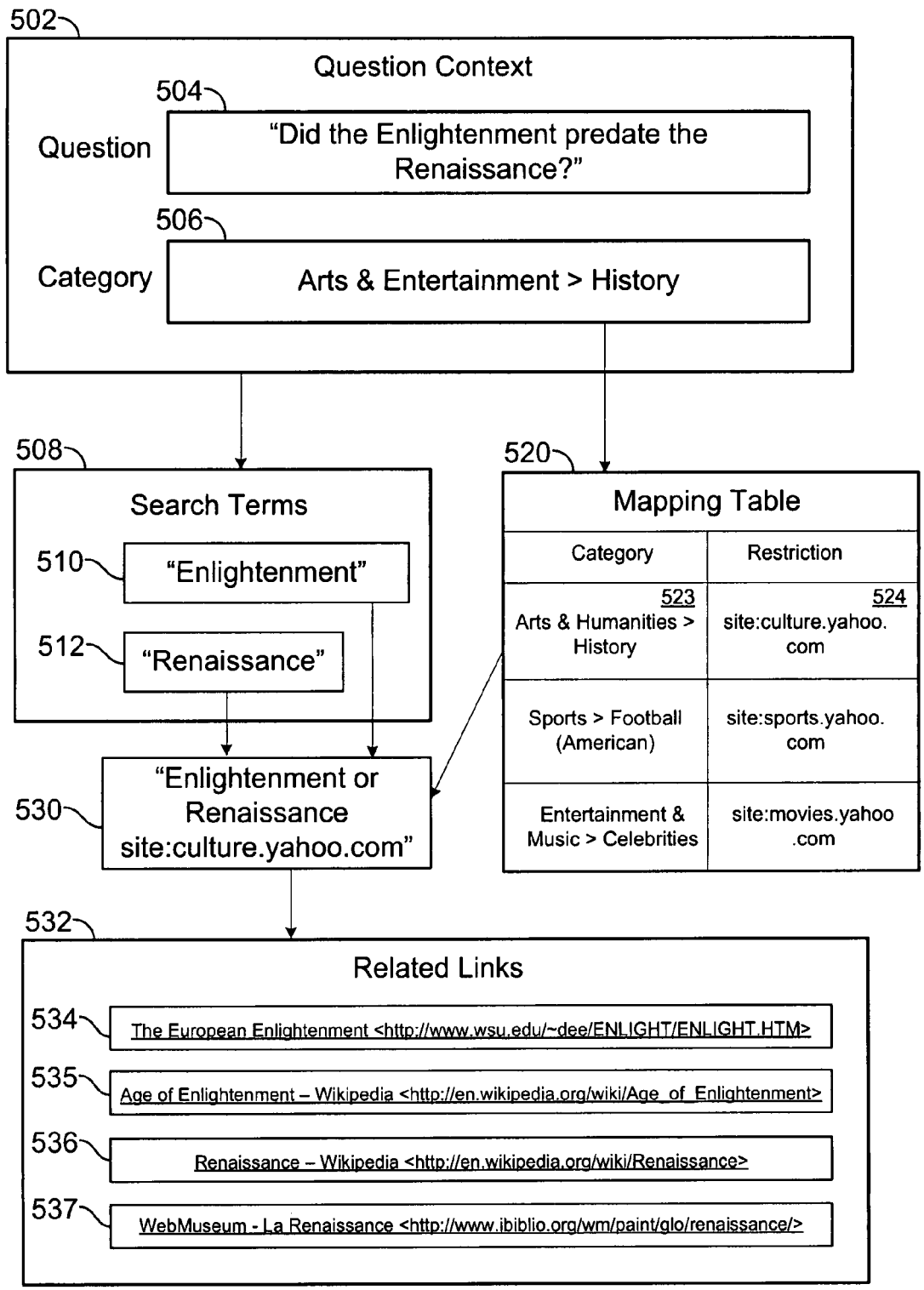
FIG. 5 is an illustrative drawing of an example of generating related links for a question in accordance with embodiments of the invention.

FIG. 5 is an illustrative drawing of an example of generating related links for a question in accordance with embodiments of the invention. This example illustrates how a set of related links 532 may be generated from a question context 502. The question context 502 includes a question 505, "Did the Enlightenment predate the Renaissance?", and a category 506, "Arts & Humanities>History." In one example, the context generator 130 of FIG. 1 processes the question context 502 as follows. The context generator 130 receives the question context 502 and invokes the search term extraction service 150 to extract search terms from the question 504. In this example, the extracted search terms 508 are "Enlightenment" 510 and "Renaissance" 512. The context generator 130 then invokes the restriction logic 142, which consults the mapping table 143 to find a row for which the category column 521 matches the given category 506. The restriction logic 142 uses the category as a "lookup key", i.e. the column that contains a value to be searched for in a table that associates values in the column with other values. The restriction that corresponds to the category is the corresponding value in the restriction column 522 of the row that matches the given category. That is, the restriction logic 142 looks up the restriction associated with the given category in the mapping table 143, which associates the restriction with the category. In this example, the first row of the mapping table 520 has a category value "Arts & Humanities>History" 523, and the corresponding value in the restriction column 522 is "site:culture.yahoo.com" 524. Therefore, the restriction is "site:culture.yahoo.com", which restricts the search to the web site culture.yahoo.com. In other words, the web site culture.yahoo.com 524 is associated with the category "Arts & Humanities>History" 523 in the mapping table 520. The context generator 130 generates the search query by constructing the logical "or" of the search terms 508, resulting in "Enlightenment or Renaissance", and adding the restriction "site:culture.yahoo.com" to the query, thereby producing the query "Enlightenment or Renaissance site:culture.yahoo.com" 530. The context generator 130 passes the query 530 to the search engine 152 to produce search results 532, which are links related to the question context 502. The search results include, for example, a link with the descriptive text "Age of Enlightenment" and an associated URL of the form "http://www.wikipedia.org/..." Some or all of the search results 532 may be displayed as related links 116 in the browser application 104 of FIG. 1.

Figure 6:
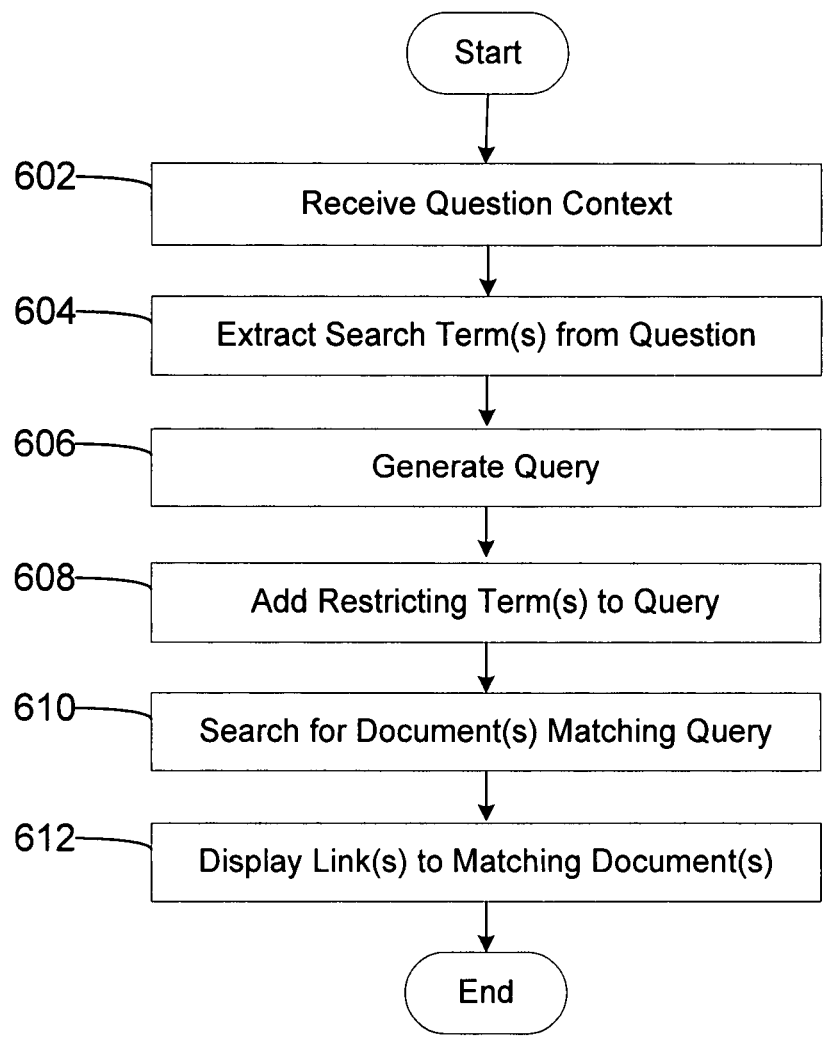
FIG. 6 is an illustrative flow diagram of a context generator process for generating related links for a question in accordance with embodiments of the invention.

FIG. 6 is an illustrative flow diagram of a context generator process 600, encoded on a computer-readable medium, for generating related links for a question in accordance with embodiments of the invention. The context generator process 600 may be executed by, for example, the client computer 102 of FIG. 1, or the server computer 229 of FIG. 2. Block 602 receives a question context. The question context includes a question and related information, such as a category and a user identifier that identifies the user who asked the question. The question context is analogous to the input context 132 of FIG. 1. Block 604 extracts search terms from the question, e.g., by invoking a search term extraction service, such as the search term extractor available through the Yahoo! Search API. Block 606 generates an initial query by constructing the logical "or" of the search terms returned by the extractor. The number of search terms in the query may be limited to a predetermined number, e.g. the first 4 terms returned by the extractor, or the 4 terms that the service ranks as most relevant. Block 606 generates a query that may be represented as a programming language object with the search terms and operators as attributes, or as a string, such as "Renaissance or Enlightenment".

Block 608 adds one or more restricting terms to the query to narrow the search to a specific site, e.g., by adding a site parameter, or to a more specific subject matter, e.g., by adding additional search terms to the query. Block 608 typically uses the category to determine the restricting terms. For example, block 608 may select the restriction from a mapping table, such as the mapping table 520 of FIG. 5. If the mapping table 520 is represented as an SQL database table that has columns for the category and corresponding restriction, the restriction that corresponds to a given category C can be selected by executing a SQL statement such as "select restriction from MappingTable where category=C". For example, to find the restriction for the category C="Arts & Humanities>History", block 608 executes the select statement and retrieves the result set, which contains the restricting term(s). In this example, the restricting term returned in the result set would include the value "site:culture.yahoo.com". Block 608 adds the restricting term(s), e.g., "site:culture.yahoo.com", to the query generated in block 606. Therefore the example query would be "Renaissance or Enlightenment site:culture.yahoo.com".

Block 610 searches for documents matching the query. For example, block 610 may execute a web search by invoking a search service, e.g., the Yahoo!® Web Search API. The search service returns a set of links to documents, such as URL's of web pages, where the documents match the query. For example, web pages on the site culture.yahoo.com that contain either the word Renaissance or the word Enlightenment would match the aforementioned example query. Block 612 displays the link(s) (if any) returned by the search, e.g., by generating an HTML representation of the links. Block 612 typically displays the link(s) on the same web page as the answer to the question, e.g., by generating an HTML representation that can be embedded the web page that displays the answer to the question. In one example, block 612 displays a subset of the links returned by the query, e.g., the first 5 links, or the top 5 links most relevant to the query. The answer to the question is typically determined by question answering logic, such as the question answering logic 162 of FIG. 1.

Figure 7:
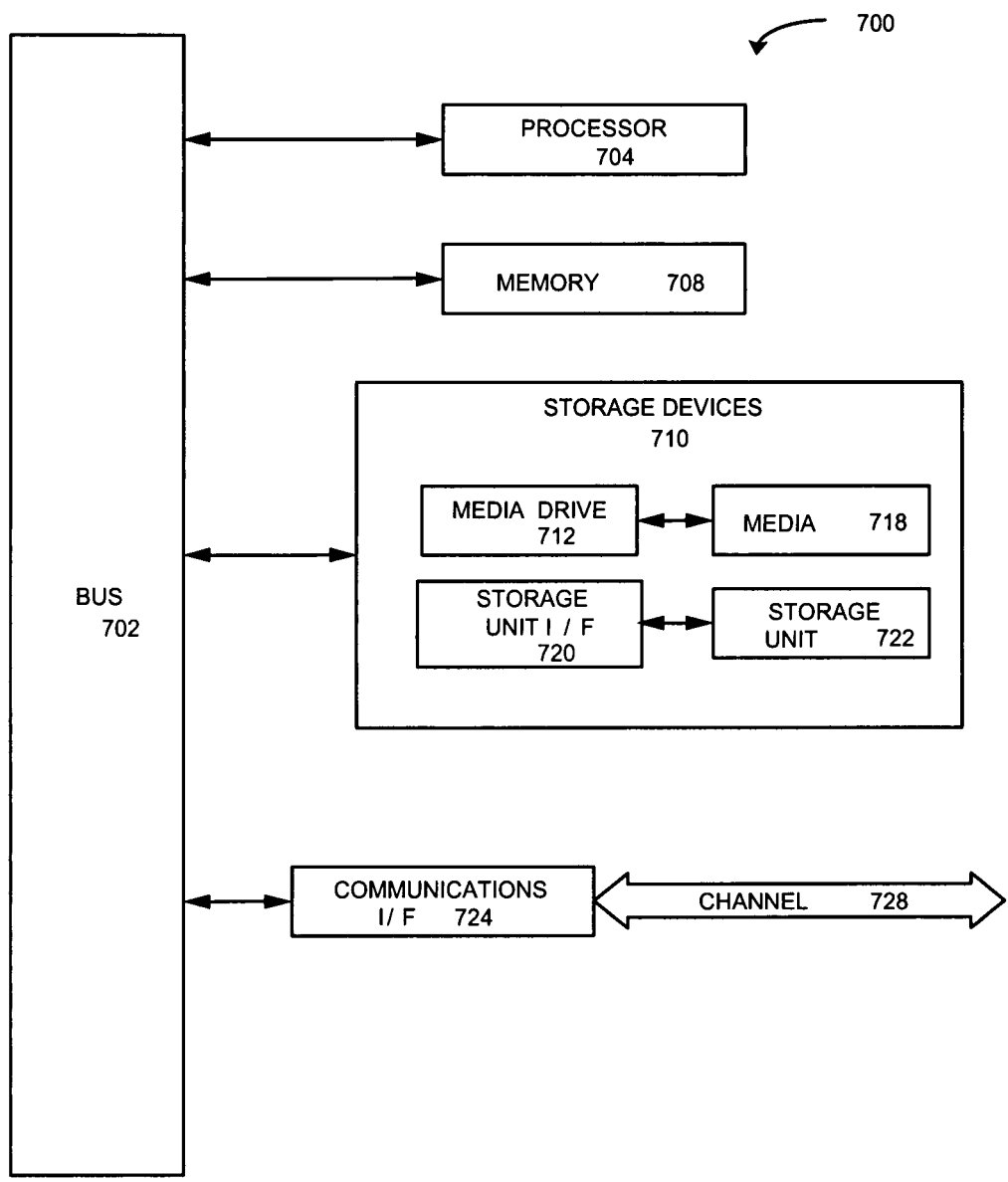
FIG. 7 is an illustrative drawing of an exemplary computer system that may be used in accordance with some embodiments of the invention.

FIG. 7 is an illustrative drawing of an exemplary computer system that may be used in accordance with some embodiments of the invention. FIG. 7 illustrates a typical computing system 700 that may be employed to implement processing functionality in embodiments of the invention. Computing systems of this type may be used in clients and servers, for example. Those skilled in the relevant art will also recognize how to implement the invention using other computer systems or architectures. Computing system 700 may represent, for example, a desktop, laptop or notebook computer, handheld computing device (PDA, cell phone, palmtop, etc.), mainframe, server, client, or any other type of special or general purpose computing device as may be desirable or appropriate for a given application or environment. Computing system 700 can include one or more processors, such as a processor 704. Processor 704 can be implemented using a general or special purpose processing engine such as, for example, a microprocessor, microcontroller or other control logic. In this example, processor 704 is connected to a bus 702 or other communication medium.

Computing system 700 can also include a main memory 708, such as random access memory (RAM) or other dynamic memory, for storing information and instructions to be executed by processor 704. Main memory 708 also may be used for storing temporary variables or other intermediate information during execution of instructions to be executed by processor 704. Computing system 700 may likewise include a read only memory ("ROM") or other static storage device coupled to bus 702 for storing static information and instructions for processor 704.

The computing system 700 may also include information storage system 710, which may include, for example, a media drive 712 and a removable storage interface 720. The media drive 712 may include a drive or other mechanism to support fixed or removable storage media, such as a hard disk drive, a floppy disk drive, a magnetic tape drive, an optical disk drive, a CD or DVD drive (R or RW), or other removable or fixed media drive. Storage media 718, may include, for example, a hard disk, floppy disk, magnetic tape, optical disk, CD or DVD, or other fixed or removable medium that is read by and written to by media drive 714. As these examples illustrate, the storage media 718 may include a computer-readable storage medium having stored therein particular computer software or data.

In alternative embodiments, information storage system 710 may include other similar components for allowing computer programs or other instructions or data to be loaded into computing system 700. Such components may include, for example, a removable storage unit 722 and an interface 720, such as a program cartridge and cartridge interface, a removable memory (for example, a flash memory or other removable memory module) and memory slot, and other removable storage units 722 and interfaces 720 that allow software and data to be transferred from the removable storage unit 718 to computing system 700.

Computing system 700 can also include a communications interface 724. Communications interface 724 can be used to allow software and data to be transferred between computing system 700 and external devices. Examples of communications interface 724 can include a modem, a network interface (such as an Ethernet or other NIC card), a communications port (such as for example, a USB port), a PCMCIA slot and card, etc. Software and data transferred via communications interface 724 are in the form of signals which can be electronic, electromagnetic, optical or other signals capable of being received by communications interface 724. These signals are provided to communications interface 724 via a channel 728. This channel 728 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms "computer program product," "computer-readable medium" and the like may be used generally to refer to media such as, for example, memory 708, storage device 718, or storage unit 722. These and other forms of computer-readable media may be involved in storing one or more instructions for use by processor 704, to cause the processor to perform specified operations. Such instructions, generally referred to as "computer program code" (which may be grouped in the form of computer programs or other groupings), when executed, enable the computing system 700 to perform features or functions of embodiments of the present invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 700 using, for example, removable storage drive 714, drive 712 or communications interface 724. The control logic (in this example, software instructions or computer program code), when executed by the processor 704, causes the processor 704 to perform the functions of the invention as described herein.

The methods disclosed herein allow a user to scan tables of numbers and quickly identify the important information. Aggregating and visually highlighting the streak information provides information that is not readily available in existing statistics displays.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

Moreover, it will be appreciated that various modifications and alterations may be made by those skilled in the art without departing from the spirit and scope of the invention. The invention is not to be limited by the foregoing illustrative details, but is to be defined according to the claims.

What is claimed is:

1. A method comprising:
    receiving, by a computing device, a question associated with an information category;
    extracting, by the computing device, at least one search term from the question;
    generating, by the computing device, a search query based upon the at least one search term;
    adding, by the computing device, at least one restricting term to the search query, the at least one restricting term based upon the information category and comprising a site scope modifier to restrict the query to at least one web site associated with the information category the site scope modifier specifying the at least one web site to which the query is restricted;
    selecting, by the computing device, the at least one web site associated with the information category from a mapping table that associates the at least one web site with the information category, the mapping table specific to a type of online forum; and
    conducting, by the computing device, a search of a hyperlinked environment for at least one document that matches the search query.

2. The method of claim 1, further comprising:
    displaying, by the computing device, at least one reference to the at least one document that matches the search query, wherein the at least one reference is displayed in association with the question.

3. The method of claim 2, wherein the at least one document comprises at least one web page, and displaying at least one reference comprises displaying at least one link to the at least one web page.

4. The method of claim 3, wherein the at least one link is displayed on a web page of an online forum in association with the question.

5. The method of claim 1, wherein the information category comprises a named level in a hierarchy of categories provided by an online forum.

6. The method of claim 1, wherein extracting at least one search term from the question comprises selecting the at least one search term from the question using a search term extractor.

7. The method of claim 1, wherein generating a search query comprises forming a disjunction of multiple search terms in response to the at least one search term comprising multiple search terms.

8. The method of claim 1, wherein conducting the web search comprises invoking a search engine to search at least one web site specified by the site scope modifier for the at least one search term.

9. The method of claim 1, wherein the at least one restricting term is based upon user preference information associated with a user.

10. The method of claim 9, wherein the user preference information comprises information associated with an online forum.

11. The method of claim 2, wherein the at least one document comprises at least one web page, and displaying at least one reference to the at least one document comprises displaying at least one link to the at least one web page.

12. A method comprising:
receiving, by a computing device, a question relating to at least one information category;
determining, by the computing device, at least one search term based upon the question;
selecting, by the computing device, at least one web site corresponding to the at least one information category;
conducting, by the computing device, a web search of the at least one web site for the at least one search term by invoking a search engine to search for the at least one search term, and a URL of the at least one web site is provided to the search engine as a site scope modifier to restrict the search to the at least one web site, the site scope modifier specifying the at least one web site to which the query is restricted; and
selecting, by the computing device, the at least one web site associated with the at least one information category from a mapping table that associates the at least one web site with the at least one information category, the mapping table specific to a type of online forum.

13. The method of claim 12, further comprising:
receiving, by the computing device, at least one matching web page from the web search; and
displaying, by the computing device, in association with the question at least one link to the at least one matching web page.

14. The method of claim 13, wherein displaying in association with the question at least one link comprises including the at least one link in a web page that includes the question.

15. The method of claim 14, further comprising making, by the computing device, the web page that includes the question available for viewing by at least one user who views the question.

16. The method of claim 12, wherein the search engine is invoked to search for at least one of a plurality of search terms in response to the at least one search term comprising the plurality of search terms.

17. The method of claim 12, wherein selecting at least one web site comprises selecting the at least one web site based upon preference information associated with a user.

18. The method of claim 12, wherein determining at least one search term comprises selecting the at least one search term from the question using a search term extractor.

19. A method comprising:
generating, by a computing device, a search query based upon search terms extracted from a question in response to receipt of the question from an invoker;
adding, by the computing device, at least one restricting term to the search query, the at least one restricting term based upon a category associated with the question and comprising a site scope modifier to restrict the query to at least one web site associated with the category, the site scope modifier specifying the at least one web site to which the query is restricted;
selecting, by the computing device, the at least one web site associated with the category from a mapping table that associates the at least one web site with the category, the mapping table specific to a type of online forum;
conducting, by the computing device, a search for computer-readable documents that match the search query; and
sending, by the computing device, to the invoker at least one link produced by the search, wherein the at least one link comprises at least one reference to at least one document that matches the search query.

20. The method of claim 19, wherein generating a search query comprises selecting at least one search term from the question using a search term extractor.

21. The method of claim 19, wherein generating a search query comprises forming a disjunction of multiple search terms in response to the at least one search term comprising multiple search terms.

22. The method of claim 19, wherein the site scope modifier is determined based upon input received from a user.

23. The method of claim 19, wherein conducting the web search comprises invoking a search engine to search at least one web site specified by the site scope modifier for the at least one search term.

24. A non-transitory computer readable storage medium comprising program code for searching documents in a hyperlinked environment, the computer readable storage medium comprising:
program code for receiving a question associated with an information category;
program code for extracting at least one search term from the question;
program code for generating a search query based upon the at least one search term;
program code for adding at least one restricting term to the search query, the at least one restricting term based upon the information category and comprising a site scope modifier to restrict the query to at least one web site associated with the information category, the site scope modifier specifying the at least one web site to which the query is restricted;
program code for selecting the at least one web site associated with the information category from a mapping table that associates the at least one web site with the information category, the mapping table specific to a type of online forum; and
program code for conducting a search of the hyperlinked environment for at least one document that matches the search query.

25. The non-transitory computer readable storage medium of claim 24, further comprising:
program code for displaying in association with the question at least one reference to the at least one document that matches the search query.

26. The non-transitory computer readable storage medium of claim 24, wherein extracting at least one search term from the question comprises selecting the at least one search term from the question using a search term extractor.

27. The non-transitory computer readable storage medium of claim 24, wherein generating a search query comprises forming a disjunction of multiple search terms in response to the at least one search term comprising multiple search terms.

28. The non-transitory computer readable storage medium of claim 24, wherein conducting the web search comprises invoking a search engine to search at least one web site specified by the site scope modifier for the at least one search term.

29. A non-transitory computer readable storage medium comprising program code for finding web pages related to a question, the computer readable storage medium comprising:
program code for generating a search query based upon search terms extracted from the question in response to receipt of the -question from an invoker;
program code for adding at least one restricting term to the search query, the at least one restricting term based upon a category associated with the question and comprising a site scope modifier to restrict the query to at least one web site associated with the category, the site scope modifier specifying the at least one web site to which the query is restricted;
program code for selecting the at least one web site associated with the category from a mapping table that associates the at least one web site with the category, the mapping table specific to a type of online forum;
program code for conducting a search for computer-readable documents that match the search query; and
program code for sending to the invoker at least one link produced by the search, wherein the at least one link comprises at least one reference to at least one document that matches the search query.

30. The non-transitory computer readable storage medium of claim 29, wherein generating a search query comprises selecting at least one search term from the question using a search term extractor.

31. The non-transitory computer readable storage medium of claim 29, wherein generating a search query comprises forming a disjunction of multiple search terms in response to the at least one search term comprising multiple search terms.

32. The non-transitory computer readable storage medium of claim 29, wherein conducting the search comprises invoking a search engine to search at least one web site specified by the site scope modifier for the at least one search term.

* * * * *